United States Patent Office 2,914,501
Patented Nov. 24, 1959

2,914,501

REACTION PRODUCT OF MINERAL OIL POLYISOBUTYLENE, POLYETHYLENE AND RESINOUS PETROLEUM POLYMERIZATION PRODUCT

Ralph Gregory D'Ascoli, Yonkers, N.Y., assignor to Anaconda Wire and Cable Company, a corporation of Delaware No Drawing. Application December 1, 1955
Serial No. 550,470

4 Claims. (Cl. 260—33.6)

This invention relates to compositions of matter, and has for its object the provision of a new composition of matter possessing good adherence to a polyethylene surface, good insulating properties, and capable of ready application under a wide variety of uses and conditions.

Few, if any, presently-available adhesive compositions will adhere directly to a polyethylene surface because of its waxy nature. In those instances where the adhesive is applied directly to the polyethylene surface, the surface is treated prior to, or after, and in some cases prior to and after, the application of the adhesive. This is the practice in printing on polyethylene. In other instances, the polyethylene surface is coated with a material which acts as an intermediate between the polyethylene surface and the adhesive or a second coating. This is the procedure commonly used in making pressure-sensitive tapes. Since the adhesive or second coating is not anchored directly to the polyethylene, it can be easily removed therefrom.

The composition of the invention is thermoplastic in nature. It requires no surface preparation of the polyethylene, either by heat, solvent or other means. The composition adheres directly to the polyethylene without any intermediate coating. The adhesion is such that both faces remain coated when pulled apart, in contradistinction to the present day pressure-sensitive tape in which one face will pull clean from the other face to which it is adhesively bound.

The unique properties of the composition of the invention are largely attributable to the combination of certain resinous polymerization products with other substances. These resinous polymerization products are obtained by catalytic polymerization of a mixture of monomers derived from deep cracking petroleum. The monomers have a molecular weight approximating 90, and are composed essentially of dienes and reactive olefins. The resin has a softening point (ball and ring) of approximately 100° C., a specific gravity of 25° C. of .970 to .975, a refractive index at 20° C. of 1.5116, an acid number less than one, an iodine value (Wijs) of 120, a bromine number of 7.3, and a molecular weight of approximately 1100. In practicing the invention, a resinous polymerization product marketed by Pennsylvania Industrial Chemical Corporation under the trade name of "Piccopale" gives very satisfactory results.

Combinations of polyethylene and polyisobutylene in various proportions are known in the art, but no combination of the two polymers yields a composition that adheres to a polyethylene surface. I have discovered that by including the aforementioned resinous polymerization product in a composition of polyethylene and polyisobutylene, in certain proportions, a composition can be prepared possessing excellent adherence to a polyethylene surface. Based on that discovery, the present invention resides in a new composition of matter possessing good adherence to a polyethylene surface, characterized by a putty-like plasticity at normal room temperatures, e.g. between 60 and 80° F., and prepared by heating at a temperature between 200 and 400° F. a reaction mixture made up of the following materials in the relative proportions recited:

|  | Broad range, percent by weight | Preferred range, percent by weight | Specific Example | |
|---|---|---|---|---|
|  |  |  | Percent by Wt. | Parts by Wt. |
| Mineral oil | 30–50 | 40–45 | 41 | 79.2 |
| Polyisobutylene | 2–7 | 4–6 | 5 | 8.8 |
| Polyethylene | 15–20 | 16–19 | 17 | 33.0 |
| "Piccopale" | 30–40 | 35–38 | 37 | 70.0 |

Polyisobutylene having a molecular weight within the range of 50,000 and 150,000, and preferably between 60,000 and 100,000, is suitable for the purposes of the invention. Such a product having a molecular weight of about 80,000 is commercially available under the trade name of Vistanex (Enjay Co. Inc.) and has been satisfactorily used in preparing the composition of the invention. The molecular weight of the polyethylene may advantageously be within the range of 5,000 and 20,000. The mineral oil is preferably a petroleum-derived heavy cable oil. In preparing the composition, the polyisobutylene may advantageously be first dissolved in the mineral oil, a solution of 10% by weight of the polymer in 90% by weight of a heavy cable oil being suitable in formulating the composition.

In preparing the composition the solution of polyisobutylene in mineral oil is heated to a temperature of around 250° F. The polyethylene and resinous polymerization product ("Piccopale") are then added while maintaing the temperature at around 250° F. and with sufficient agitation for intimate mixture of the reacting materials. The resulting mixture or reaction product is liquid. It may be directly used in its heated condition, or cooled to room temperature whereupon it becomes plastic and can be worked and used much like putty.

At normal room temperatures, the composition, in its preferred form, has the body of chewed chewing gum. It remains pliable and moldable at temperatures below 32° F., and can still be hand molded at 20° F. It does not flow at temperatures up to 160° F. When heated above 212 F. it is liquid and can be poured. In addition to adhering to a polyethylene surface, the composition will adhere to other plastics, to metals, fabrics, rubber, wood, enamel, paper, etc. It may thus be used to advantage in joining together polyethylene surfaces and in joining a polyethylene surface to the surface of another material.

To illustrate an effective use of the composition of the invention, three bared ends of polyethylene insulated conductors were twisted together, and then covered with the composition by hand forming. The composition also covered adjacent portions of the insulation next to the twist. The resulting splice was then immersed in water, and tested by a Megger at 600 volts. Three splices thus tested showed an infinite insulation resistance after 10 weeks' immersion. Unless the adhesive bond between the composition and the polyethylene insulation had been practically perfect, infinite insulation resistance would have been unattainable. The slightest non-bond between the insulation and the composition would yield a low, or no, insulation resistance, and a current path would exist between the bared conductors and the water.

I claim:

1. A composition of matter consisting of the reaction product resulting from heating to a temperature within the range of 200 to 400° F. a mixture made up essentially of 30 to 50% by weight of mineral oil, 2 to 7% by weight of polyisobutylene having a molecular weight between 50,000 and 150,000, 15 to 20% by weight of polyethylene having a molecular weight between 5,000 and 20,000, and 30 to 40% by weight of a resinous polymerization product obtained by catalytic polymerization of a mixture of unsaturated monomers derived from deep cracking petroleum, said resin having a softening point (B&R) of approximately 100° C., a specific gravity at 25° C. of .970 to .975, a refractive index at 20° C. of 1.5116, and an acid number less than one, an iodine value (Wijs) of 120, a bromine number of 7.3 and a molecular weight of approximately 1100, said reaction product being characterized by good adherance to a polyethylene surface and a putty-like plasticity at normal room temperature.

2. A composition of matter according to claim 1, in which the polyisobutylene has a molecular weight between 60,000 and 100,000.

3. A composition of matter according to claim 2, in which the reaction mixture is made up of 40 to 45% of mineral oil, 4 to 6% of polyisobutylene, 16 to 19% of polyethylene, and 35 to 38% of the resinous polymerization product obtained by catalytic polymerization of a mixture of unsaturated monomers derived from deep cracking petroleum.

4. A composition of matter consisting of the reaction product resulting from heating to a temperature within the range of 200 to 400° F. a mixture made up essentially of about 41% by weight of a petroleum-derived heavy cable oil, about 5% by weight of polyisobutylene having an average molecular weight of about 80,000, about 17% by weight of polyethylene having a molecular weight between 5,000 and 20,000, and about 37% by weight of a resinous polymerization product obtained by catalytic polymerization of a mixture of unsaturated monomers derived from deep cracking petroleum, said resin having a softening point (B&R) of approximately 100° C., a specific gravity at 25° C. of .970 to 975, a refractive index at 20° C. of 1.5116, and an acid number less than one, an iodine value (Wijs) of 120, a bromine number of 7.3, and a molecular weight of approximately 1100, said reaction product being characterized by good adherence to a polyethylene surface and a putty-like plasticity at normal room temperature.

No references cited.